(12) United States Patent
Kim (10) Patent No.: US 9,590,225 B2
(45) Date of Patent: Mar. 7, 2017

(54) SECONDARY BATTERY (71) Applicant: SAMSUNG SDI CO., LTD., Yongin-si, Gyeonggi-do (KR)

(72) Inventor: Hakkyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/721,836

(22) Filed: May 26, 2015

(65) Prior Publication Data

US 2016/0197335 A1 Jul. 7, 2016

(30) Foreign Application Priority Data

Jan. 7, 2015 (KR) ........................ 10-2015-0001942

(51) Int. Cl.
*H01M 2/30* (2006.01)
*H01M 2/22* (2006.01)
*H01M 2/26* (2006.01)

(52) U.S. Cl.
CPC .............. *H01M 2/30* (2013.01); *H01M 2/22* (2013.01); *H01M 2/26* (2013.01)

(58) Field of Classification Search
CPC ............ H01M 2/06; H01M 2/22; H01M 2/30; H01M 10/0436; H01M 2220/30
See application file for complete search history.

(56) References Cited

U.S. PATENT DOCUMENTS

| 7,122,275 B2 | 10/2006 | Woehrle et al. |
| 2003/0232243 A1 | 12/2003 | Hong |
| 2007/0196732 A1* | 8/2007 | Tatebayashi .......... B60L 11/123 429/181 |
| 2010/0047687 A1 | 2/2010 | Lee et al. |
| 2010/0086845 A1 | 4/2010 | Jung et al. |
| 2011/0117406 A1* | 5/2011 | Cho .......................... H01M 2/22 429/94 |
| 2012/0202105 A1 | 8/2012 | Shinyashiki et al. |
| 2013/0230766 A1 | 9/2013 | Ahn |

FOREIGN PATENT DOCUMENTS

| EP | 1 369 939 A2 | 12/2003 |
| EP | 2 363 907 A1 | 9/2011 |
| EP | 2 002 495 B1 | 9/2015 |
| KR | 10-2008-0012181 | 2/2008 |
| KR | 10-0821857 | 4/2008 |
| KR | 10-2012-0040447 | 4/2012 |
| KR | 10-2013-0100626 | 9/2013 |

OTHER PUBLICATIONS

EPO Search Report dated May 30, 2016 for corresponding European Patent Application 15196088.7, (7 pages).

* cited by examiner

*Primary Examiner* — Brittany Raymond
(74) *Attorney, Agent, or Firm* — Lewis Roca Rothgerber Christie LLP (57) ABSTRACT

A secondary battery including: an electrode assembly including an electrode tab; a case accommodating the electrode assembly; and a lead tab forming a coupling portion inside the case together with the electrode tab, the lead tab drawn out to an outside of the case, and the coupling portion includes a first bent portion including a bent end of the electrode tab, and a second bent portion including a bent end of the lead tab coupled to the bent end of the electrode tab.

10 Claims, 6 Drawing Sheets

SECONDARY BATTERY

CROSS-REFERENCE TO RELATED APPLICATION

This application claims priority to and the benefit of Korean Patent Application No. 10-2015-0001942, filed on Jan. 7, 2015 in the Korean Intellectual Property Office, the entire content of which is incorporated by reference herein.

BACKGROUND

1. Field

Aspects of embodiments of the present invention relate to a secondary battery.

2. Description of the Related Art

Recently, wearable devices such as fitness bands and smart watches are drawing remarkable attention. The wearable devices require small-sized batteries and generally employ pouch-type secondary batteries.

In general, a pouch-type secondary battery includes a portion formed at its end, which is also called a terrace. The terrace is a space where a lead tab drawn from a case and an electrode tab connected to an electrode assembly positioned inside the case are coupled to each other and is a portion that is not related to battery energy density.

The terrace occupies a predetermined volume of the pouch-type secondary battery. Accordingly, in order to reduce the battery size while increasing the energy density, it is necessary to develop methods for reducing the size of the terrace.

SUMMARY

According to an aspect of embodiments of the present invention, a secondary battery has an improved energy density by minimizing or reducing the overall size by reducing a coupling portion of a lead tab and an electrode tab and/or increasing a size of an electrode assembly by the reduced size of the secondary battery.

The above and other aspects of embodiments of the present invention will be described or be apparent from the following description of some exemplary embodiments.

According to one or more embodiments of the present invention, a secondary battery includes: an electrode tab; a case accommodating the electrode assembly; and a lead tab forming a coupling portion inside the case together with the electrode tab, the lead tab drawn out to an outside of the case, and the coupling portion includes a first bent portion including a bent end of the electrode tab, and a second bent portion including a bent end of the lead tab coupled to the bent end of the electrode tab.

The secondary battery may further include an insulation tape attached to the coupling portion, wherein the insulation tape is bent together with the bent end of the electrode tab and the bent end of the lead tab and positioned at both an outside of the coupling portion and an inside of the coupling portion.

The secondary battery may further include an insulation tape surrounding an outside of the coupling portion.

The coupling portion may include a welding portion at which the electrode tab and the lead tab are welded to each other, the welding portion being positioned inside the coupling portion.

The first bent portion and the second bent portion may be bent in a U-shaped configuration.

According to another embodiment of the present invention, a secondary battery includes: an electrode assembly including an electrode tab; a case accommodating the electrode assembly; and a lead tab forming a coupling portion inside the case together with the electrode tab, the lead tab drawn out to an outside of the case, and the coupling portion includes an end of the electrode tab and an end of the lead tab that are bent in a wound configuration.

The secondary battery may further include an insulation tape attached to the coupling portion, wherein the insulation tape is wound together with the electrode tab and the lead tab and positioned at both an outside of the coupling portion and an inside of the coupling portion.

The secondary battery may further include an insulation tape surrounding an outside of the coupling portion.

The coupling portion may include a welding portion at which the electrode tab and the lead tab are welded to each other, the welding portion being positioned inside the coupling portion.

The end of the electrode tab and the end of the lead tab may be bent more than twice in a folded S-shaped configuration.

As described above, according to an aspect of embodiments of the present invention, the secondary battery has an improved energy density by minimizing or reducing the overall size by reducing a coupling portion of a lead tab and an electrode tab and/or increasing a size of an electrode assembly by the reduced size of the secondary battery.

BRIEF DESCRIPTION OF THE DRAWINGS

The above and other features and aspects of embodiments of the present invention will become more apparent by describing in further detail some exemplary embodiments thereof with reference to the attached drawings, in which.

DETAILED DESCRIPTION

Hereinafter, some exemplary embodiments of the present invention will be described in further detail with reference to the accompanying drawings. Various aspects of embodiments of the present invention may be embodied in many different forms and should not be construed as being limited to the example embodiments set forth herein. Rather, these example embodiments of the disclosure are provided so that this disclosure will be thorough and complete and will convey various aspects of the disclosure to those skilled in the art. As those skilled in the art would realize, the described embodiments may be modified in various different ways, all without departing from the spirit or scope of the present invention. Accordingly, the drawings and description are to be regarded as illustrative in nature and not restrictive.

Figure 1:
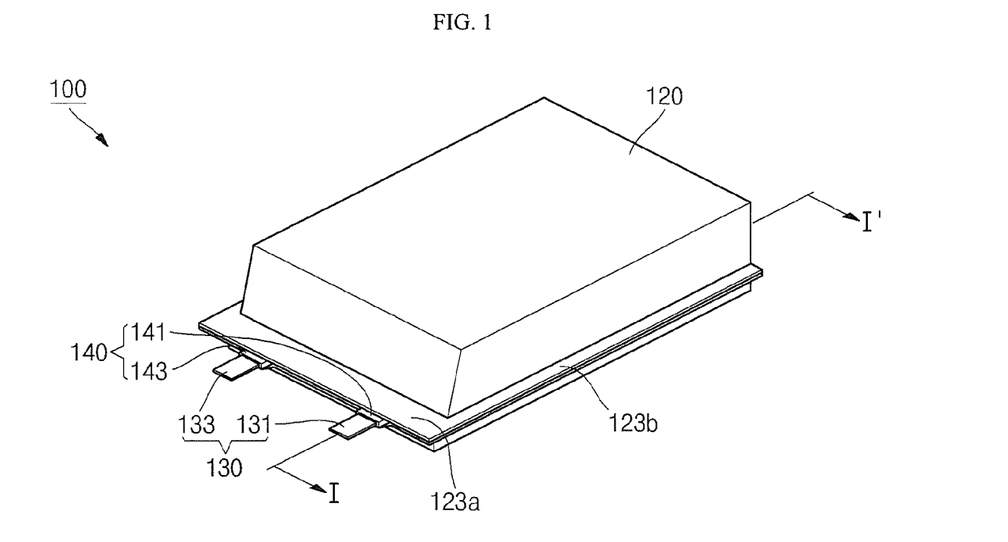
FIG. 1 is a perspective view of a secondary battery according to an embodiment of the present invention.
Figure 2A:
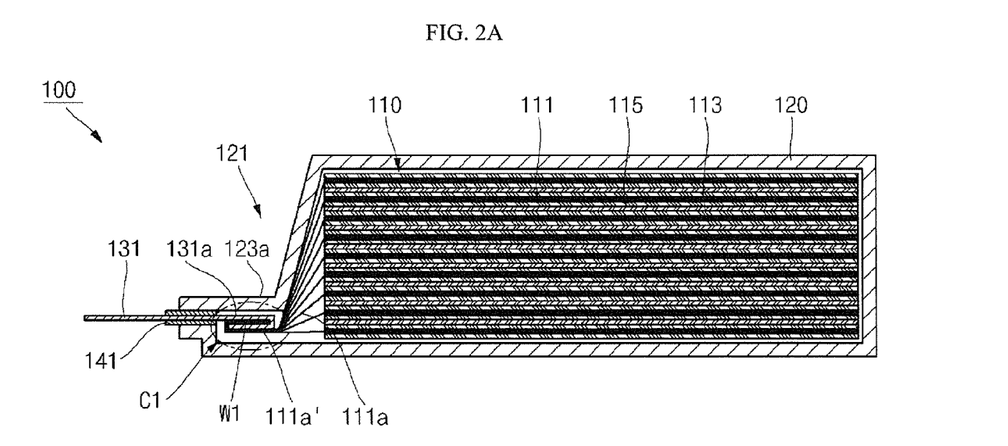
FIGS. 2A, 2B, and 2D are cross-sectional views of the secondary battery of FIG. 1, taken along the line I-I'.
Figure 2B:
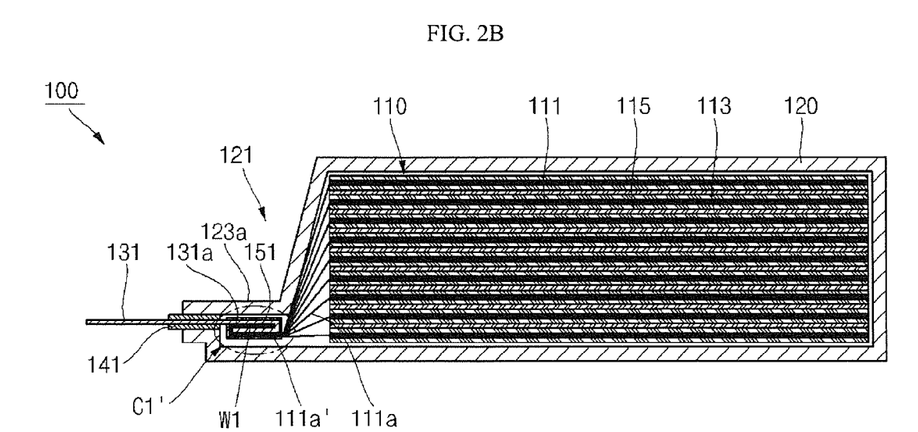
Figure 2C:
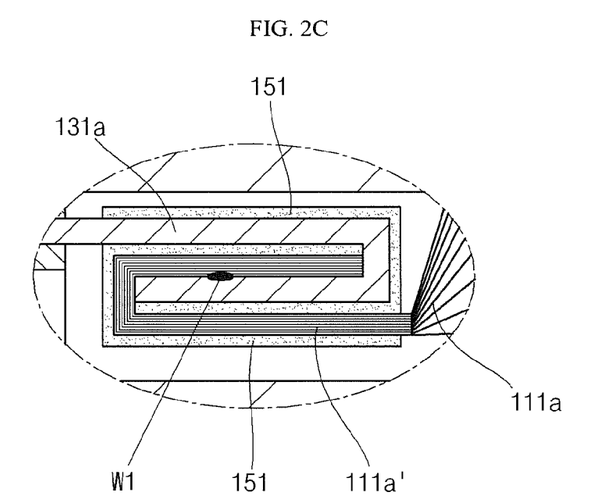
FIG. 2C is an enlarged view of a coupling portion shown in FIG. 2B.
Figure 2D:
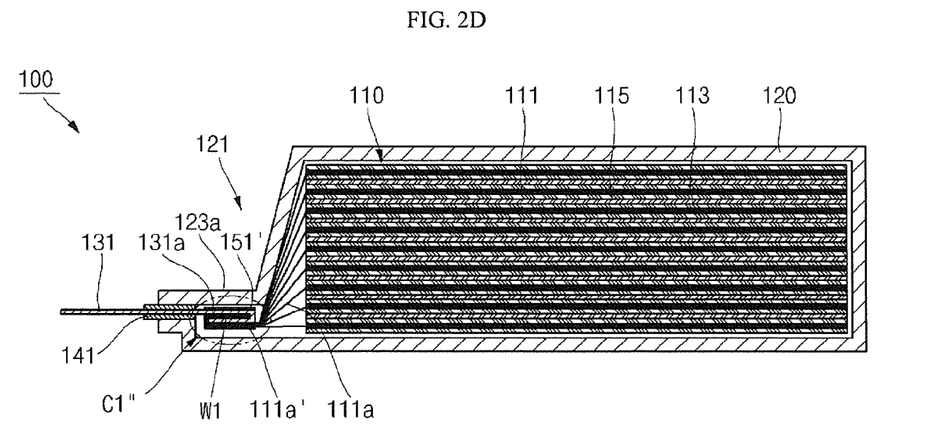

FIG. 1 is a perspective view of a secondary battery according to an embodiment of the present invention; FIGS. 2A, 2B, and 2D are cross-sectional views of the secondary battery of FIG. 1, taken along the line I-I'; FIG. 2C is an enlarged view of a coupling portion shown in FIG. 2B; and FIG. 2E is an enlarged view of a coupling portion shown in FIG. 2D.

Figure 2E:
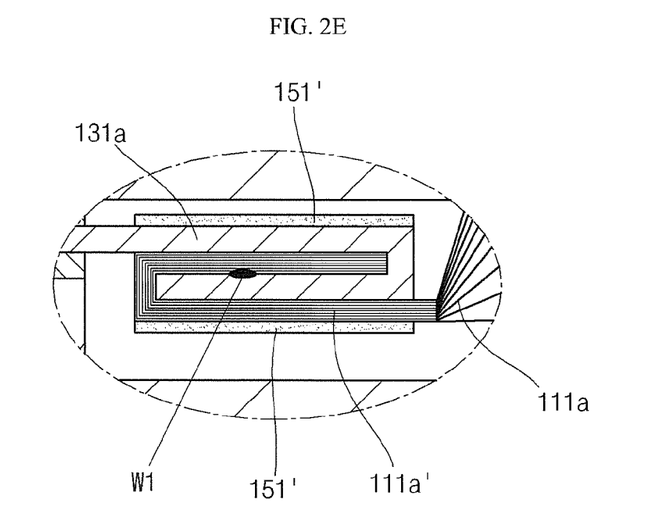
FIG. 2E is an enlarged view of a coupling portion shown in FIG. 2D.

Referring to FIGS. 1 to 2E, a secondary battery 100 according to an embodiment of the present invention includes an electrode assembly 110, a case 120, and a lead tab 130.

The electrode assembly 110 may include a first electrode plate 111, a second electrode plate 113, a first electrode tab 111a extending from the first electrode plate 111, a second electrode tab (not shown) extending from the second electrode plate 113, and a separator 115 interposed between the first electrode plate 111 and the second electrode plate 113.

The first electrode plate 111, in one embodiment, may include a first electrode current collector having a first electrode active material coated on at least one surface thereof, and a plurality of first electrode tabs 111a extending from the first electrode current collector. The first electrode active material may include a positive electrode active material, such as a transition metal oxide, and the first electrode current collector may be a metal foil made of, for example, aluminum (Al). However, embodiments of the present invention are not limited to the materials described above.

The first electrode tab 111a may be formed by extending from the first electrode plate 111 and protruding a length (e.g., a predetermined length), and an electrode active material is not coated on the first electrode tab 111a. The first electrode tab 111a may be made of, for example, aluminum (Al). However, embodiments of the present invention are not limited to the materials described above.

The second electrode plate 113, in one embodiment, may include a second electrode current collector having a second electrode active material coated on at least one surface thereof, and a plurality of second electrode tabs (not shown) extending from the second electrode current collector.

The second electrode active material may include a negative electrode active material, such as graphite or carbon, and the second electrode current collector may be a metal foil made of, for example, copper (Cu) or nickel (Ni). However, embodiments of the present invention are not limited to the materials described above.

The second electrode tabs (not shown) may be formed by extending from the second electrode plate 113 and protruding a length (e.g., a predetermined length), and an electrode active material is not coated on the second electrode tabs. The second electrode tabs may be made of, for example, nickel (Ni). However, embodiments of the present invention are not limited to the materials described above.

The separator 115 is disposed between the first electrode plate 111 and the second electrode plate 113 and may inhibit short circuits between the first electrode plate 111 and the second electrode plate 113.

In one embodiment of the present invention, the secondary battery 100 is implemented with the electrode assembly 110 that is a stacked electrode assembly, for example. Alternatively, the secondary battery may also be implemented with a wound electrode assembly. In this case, however, electrode tabs may be welded to the first electrode plate 111 and the second electrode plate 113, respectively.

The case 120, in one embodiment, is formed of a soft packing material, such as an aluminum laminate sheet, and provides an internal space for accommodating the electrode assembly 110. The case 120 may be formed in a pouch shape and may have a first sealing portion 123a and a second sealing portion 123b formed on its outer circumferential surface. The first sealing portion 123a is a portion crossing the lead tab 130 drawn out from the case 120, and the second sealing portion 123b may be defined as a sealing portion other than the first sealing portion 123a. A terrace portion 121 may be formed at one end of the case 120, which is adjacent to the first sealing portion 123a. The terrace portion 121 may be a predetermined space within the case 120, where a coupling portion C1, C1', C1", which will later be described, is to be formed. The lead tab 130 may include a first lead tab 131 and a second lead tab 133.

One end of the first lead tab 131 and one end of the first electrode tab 111a may form a coupling portion C1 inside the case 120, that is, in the terrace portion 121, and the other end of the first lead tab 131 may be drawn out from the case 120 through the first sealing portion 123a. The second lead tab 133 may be formed in the same configuration as the first lead tab 131. Thus, the following description will be made with regard to the first lead tab 131 and the first electrode tab 111a.

The coupling portion C1 may be formed by forming a welding portion W1 by welding the one end of the first electrode tab 111a and the one end of the first lead tab 131 to each other, such as through ultrasonic welding or resistance welding, and bending the one end of the first electrode tab 111a and the one end of the first lead tab 131. For example, as shown in FIG. 2A, the one end of the first electrode tab 111a and the one end of the first lead tab 131 are bent in a U-shaped configuration to form a first bent portion 111a' and a second bent portion 131a, respectively, to then be meshed with each other and then coupled to each other.

In one embodiment, the welding portion W1 may be formed before the first bent portion 111a' and the second bent portion 131a are formed and may be positioned inside the coupling portion C1.

If the coupling portion C1 is formed in such a shape, a space required for arrangement of a conventional coupling portion bent in a V-shaped or L-shaped configuration inside a battery case may be reduced, and the size of the electrode assembly 110 may thereby be increased due to the reduced size of the coupling portion C1.

For example, if a conventional terrace portion is about 5 mm long, the terrace portion 121 having the coupling portion C1 according to an embodiment of the present invention may be formed to have a length of about 3.5 mm. Therefore, since the length of the terrace portion may be reduced by about 1.5 mm and the length of the electrode plate of the electrode assembly 110 may be increased by that amount, that is, by about 1.5 mm, the secondary battery 100 including the electrode assembly 110 having an increased size may have an increased capacity, compared to the conventional secondary battery having the same size. Further, if the length of the electrode assembly 110 is not increased, the overall size of the secondary battery 100 can be reduced, compared to the conventional secondary battery having the same capacity.

As shown in FIGS. 2B and 2C, the secondary battery 100 according to an embodiment of the present invention may alternatively have a coupling portion C1' formed by attaching an insulation tape 151 to the first bent portion 111a' and the second bent portion 131a. The insulation tape 151 may be attached to surround ends of the first lead tab 131 and the first electrode tab 111a, which are welded to each other, and may then be bent together with the ends of the first lead tab 131 and the first electrode tab 111a. Accordingly, as shown in FIG. 2C, the insulation tape 151 is positioned outside and inside the coupling portion C1'. That is, the insulation tape 151 is positioned at portions between the first bent portion 111a' and the second bent portion 131a.

As shown in FIGS. 2D and 2E, the secondary battery 100 according to an embodiment of the present invention may alternatively have the coupling portion C''' formed by attaching an insulation tape 151' to surround the first bent portion 111a' and the second bent portion 131a. Accordingly, the insulation tape 151' is positioned only outside the first bent portion 111a' and the second bent portion 131a.

The insulation tapes 151 and 151' may increase coupling forces of the coupling portions C1' and C1'' and may inhibit electrical short circuits. The insulation tapes 151 and 151' may include a polyimide (PI) tape, but embodiments of the present invention are not limited thereto.

As shown in FIGS. 1, 2A, 2B, and 2D, the secondary battery 100 according to an embodiment of the present invention may further include an insulation film 140. The insulation film 140 may include a first insulation film 141 attached to the first lead tab 131 and a second insulation film 143 attached to the second lead tab 133. In order to increase sealing efficiency of the case 120 and to secure an electrically insulated state, the insulation film 140 may be positioned between the electrode tabs and the first sealing portion 123a.

The insulation film 140 may include a polypropylene (PP) film, but embodiments of the present invention are not limited thereto.

Figure 3A:
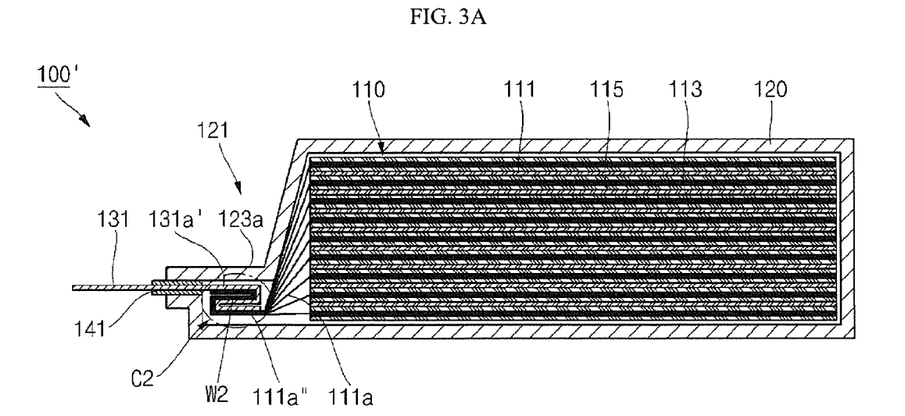
FIGS. 3A, 3B, and 3D are cross-sectional views of a secondary battery according to another embodiment of the present invention, taken along a line corresponding to the line I-I' of FIG. 1.
Figure 3B:
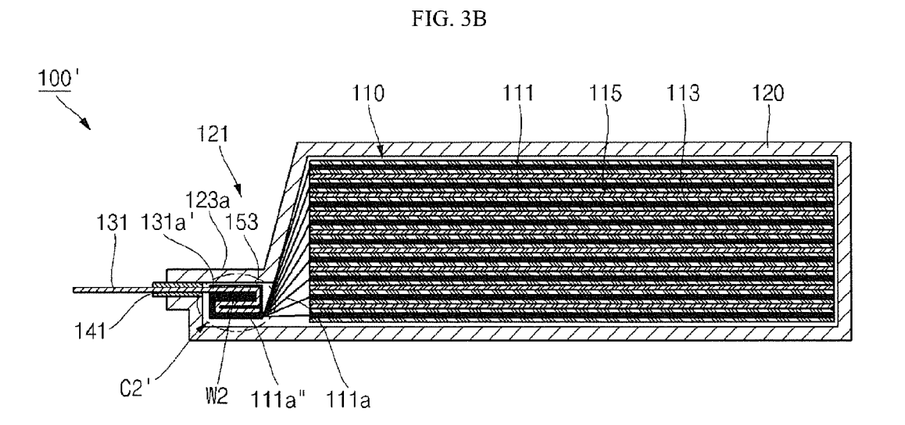
Figure 3C:
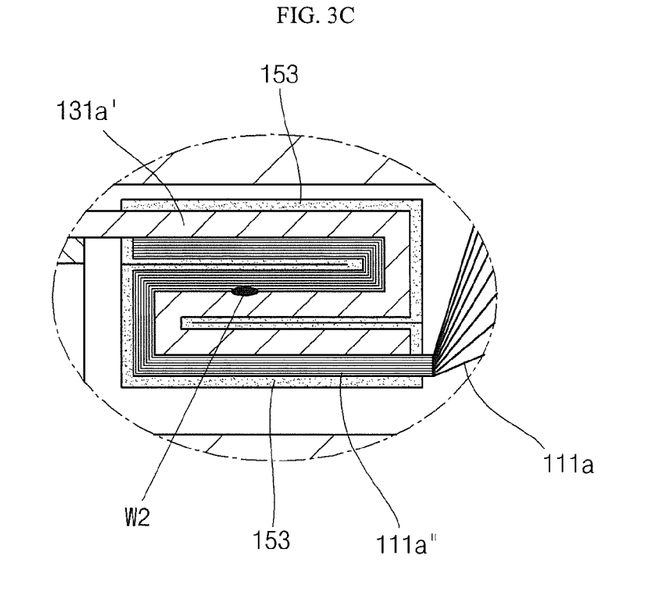
FIG. 3C is an enlarged view of a coupling portion shown in FIG. 3B.
Figure 3D:
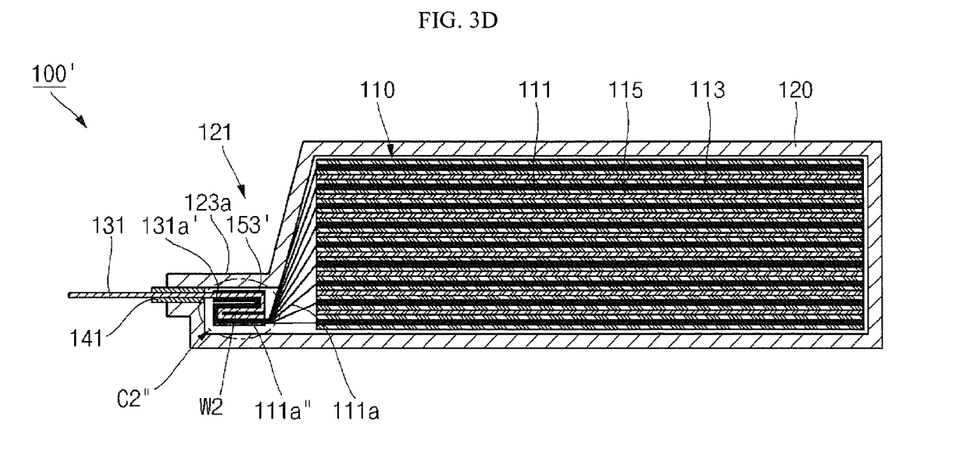
Figure 3E:
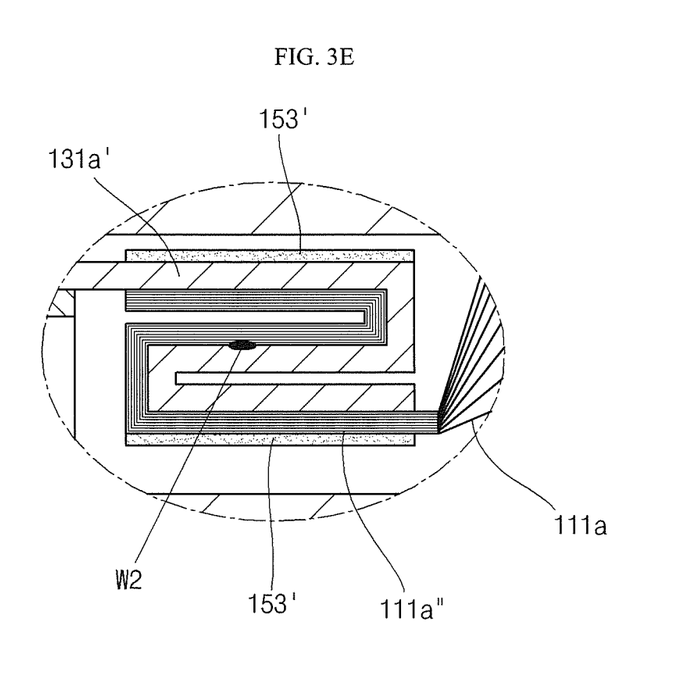
FIG. 3E is an enlarged view of a coupling portion shown in FIG. 3D.

FIGS. 3A, 3B, and 3D are cross-sectional views of a secondary battery according to another embodiment of the present invention, taken along a line corresponding to the line I-I' of FIG. 1; FIG. 3C is an enlarged view of a coupling portion shown in FIG. 3B; and FIG. 3E is an enlarged view of a coupling portion shown in FIG. 3D.

Referring to FIGS. 3A to 3E, a secondary battery 100' according to another embodiment of the present invention is different from the secondary battery 100 described above in view of a configuration of a coupling portion C2. Thus, the following description will focus on the coupling portion C2 and detailed description of other components which are the same as those of the previously described embodiment will not be repeated.

The coupling portion C2 may be formed by forming a welding portion W2 by welding one end 111a'' of the first electrode tab 111a and one end 131a' of the first lead tab 131 to each other, such as through ultrasonic welding or resistance welding, and bending the one end 111a'' of the first electrode tab 111a and the one end 131a' of the first lead tab 131 in a wound configuration. For example, as shown in FIG. 3A, the one end 111a'' of the first electrode tab 111a and the one end 131a' of the first lead tab 131 may be coupled to each other by being bent more than twice in a folded, meandering S-shaped configuration.

In one embodiment, the welding portion W2 may be formed before the one end 111a'' of the first electrode tab 111a and the one end 131a' of the first lead tab 131 are bent and may be positioned inside the coupling portion C2.

If the coupling portion C2 is formed in such a shape, a space required for arrangement of a conventional coupling portion bent in a V-shaped or L-shaped configuration inside a battery case may be reduced, and the size of the electrode assembly 110 may thereby be increased due to the reduced size of the coupling portion C2. Further, if the size of the electrode assembly 110 is not increased, the overall size of the secondary battery 100' can be reduced, compared to the conventional secondary battery having the same capacity.

As shown in FIGS. 3B and 3C, the secondary battery 100' according to an embodiment of the present invention may alternatively have a coupling portion C2' formed by attaching an insulation tape 153 to the one end 111a'' of the first electrode tab 111a and the one end 131a' of the first lead tab 131. Here, since the insulation tape 153 is attached to the one end 111a'' of the first electrode tab 111a and the one end 131a' of the first lead tab 131 before the one end 111a'' of the first electrode tab 111a and the one end 131a' of the first lead tab 131 are bent, the insulation tape 153 is positioned outside and inside the coupling portion C2', as shown in FIGS. 3B and 3C. That is, the insulation tape 153 is positioned at portions between the one end 111a'' of the first electrode tab 111a and the one end 131a' of the first lead tab 131.

As shown in FIGS. 3D and 3E, the secondary battery 100' according to an embodiment of the present invention may alternatively have a coupling portion C2'' formed by attaching an insulation tape 153' to surround the one end 111a'' of the first electrode tab 111a and the one end 131a' of the second bent portion 131a. Accordingly, the insulation tape 153' is positioned only outside the coupling portion C2''.

The insulation tapes 153 and 153' may increase coupling forces of the coupling portions C2' and C2'' and may inhibit electrical short circuits. The insulation tapes 153 and 153' may include a polyimide (PI) tape, but embodiments of the present invention are not limited thereto.

As shown in FIGS. 3A, 3B, and 3D, the secondary battery 100' according to an embodiment of the present invention may further include the insulation film 140. The insulation film 140 may include the first insulation film 141 attached to the first lead tab 131 and the second insulation film 143 attached to the second lead tab 133. In order to increase sealing efficiency of the case 120 and to secure an electrically insulated state, the insulation film 140 may be positioned between the electrode tabs and the first sealing portion 123a.

The insulation film 141 may include a polypropylene (PP) film, but embodiments of the present invention are not limited thereto.

While the present invention has been particularly shown and described with reference to some exemplary embodiments thereof, it will be understood by those of ordinary skill in the art that various changes in form and details may be made therein without departing from the spirit and scope of the present invention as defined by the following claims and equivalents thereof.

What is claimed is:

1. A secondary battery comprising:
    an electrode assembly comprising an electrode tab;
    a case comprising a pouch-shaped portion accommodating the electrode assembly and a terrace portion having a thickness less than a thickness of the pouch-shaped portion; and
    a lead tab forming a coupling portion inside the terrace portion of the case together with the electrode tab, the lead tab drawn out to an outside of the case,
    wherein the coupling portion comprises a first bent portion including a bent end of the electrode tab, and a second bent portion including a bent end of the lead tab coupled to the bent end of the electrode tab.

2. The secondary battery of claim 1, further comprising an insulation tape surrounding an outside of the coupling portion.

3. The secondary battery of claim 1, wherein the coupling portion comprises a welding portion at which the electrode tab and the lead tab are welded to each other, the welding portion being positioned inside the coupling portion.

4. The secondary battery of claim 1, wherein the first bent portion and the second bent portion are bent in a U-shaped configuration.

5. A secondary battery comprising:
an electrode assembly comprising an electrode tab;
a case accommodating the electrode assembly; and
a lead tab forming a coupling portion inside the case together with the electrode tab, the lead tab drawn out to an outside of the case,
wherein the coupling portion comprises a first bent portion including a bent end of the electrode tab, and a second bent portion including a bent end of the lead tab coupled to the bent end of the electrode tab, and
wherein the secondary battery further comprises an insulation tape attached to the coupling portion, wherein the insulation tape is bent together with the bent end of the electrode tab and the bent end of the lead tab and positioned at both an outside of the coupling portion and an inside of the coupling portion.

6. A secondary battery comprising:
an electrode assembly comprising an electrode tab;
a case comprising a pouch-shaped portion accommodating the electrode assembly and a terrace portion having a thickness less than a thickness of the pouch-shaped portion; and
a lead tab forming a coupling portion inside the terrace portion of the case together with the electrode tab, the lead tab drawn out to an outside of the case,
wherein the coupling portion comprises an end of the electrode tab and an end of the lead tab that are bent in a wound configuration.

7. The secondary battery of claim 6, further comprising an insulation tape surrounding an outside of the coupling portion.

8. The secondary battery of claim 6, wherein the coupling portion comprises a welding portion at which the electrode tab and the lead tab are welded to each other, the welding portion being positioned inside the coupling portion.

9. The secondary battery of claim 6, wherein the end of the electrode tab and the end of the lead tab are bent more than twice in a folded S-shaped configuration.

10. A secondary battery comprising:
an electrode assembly comprising an electrode tab;
a case accommodating the electrode assembly; and
a lead tab forming a coupling portion inside the case together with the electrode tab, the lead tab drawn out to an outside of the case,
wherein the coupling portion comprises an end of the electrode tab and an end of the lead tab that are bent in a wound configuration, and
wherein the secondary battery further comprises an insulation tape attached to the coupling portion, wherein the insulation tape is wound together with the electrode tab and the lead tab and positioned at both an outside of the coupling portion and an inside of the coupling portion.

* * * * *